US 6,663,781 B1

(12) United States Patent
Huling et al.

(10) Patent No.: US 6,663,781 B1
(45) Date of Patent: Dec. 16, 2003

(54) CONTAMINANT ADSORPTION AND OXIDATION VIA THE FENTON REACTION

(75) Inventors: Scott G. Huling, Ada, OK (US); Robert G. Arnold, Tucson, AZ (US); Raymond A. Sierka, Tucson, AZ (US)

(73) Assignees: U.S. Environmental Protection Agency, Washington, DC (US); The University of Arizona, Tucson, AZ (US)

(*) Notice: Subject to any disclaimer, the term of this patent is extended or adjusted under 35 U.S.C. 154(b) by 0 days.

(21) Appl. No.: 09/649,816

(22) Filed: Aug. 28, 2000

Related U.S. Application Data

(63) Continuation-in-part of application No. 09/310,932, filed on May 13, 1999, now abandoned.
(60) Provisional application No. 60/085,416, filed on May 14, 1998, and provisional application No. 60/205,566, filed on May 22, 2000.

(51) Int. Cl.⁷ .............................. C02F 1/28; C02F 1/72
(52) U.S. Cl. .................. 210/668; 210/673; 210/679; 210/694; 210/747

(58) Field of Search ................. 210/668, 679, 210/694, 747, 759, 763, 673

(56) References Cited

U.S. PATENT DOCUMENTS

| | | | | |
|---|---|---|---|---|
| 5,534,154 A | * | 7/1996 | Gillham | 210/679 |
| 5,667,690 A | * | 9/1997 | Doddema et al. | 210/747 |
| 5,716,528 A | * | 2/1998 | Jasim et al. | 210/668 |
| 5,755,977 A | * | 5/1998 | Gurol et al. | 210/759 |
| 5,967,230 A | * | 10/1999 | Cooper et al. | 210/747 |

* cited by examiner

*Primary Examiner*—Ivars Cintins
(74) *Attorney, Agent, or Firm*—Browdy and Neimark, P.L.L.C.

(57) ABSTRACT

Contaminated water is treated by adsorbing contaminant onto a sorbent to concentrate the contaminant and then oxidizing the contaminant via the Fenton and related reactions. Iron is attached to the sorbent or can be added in solution with an oxidant. Both systems, iron attached to the sorbent or iron in solution, can be used to oxidize contaminants on or near the surface of the sorbent. The process can be used to treat contaminated water in above-ground and below-ground treatment systems.

19 Claims, 7 Drawing Sheets

| Calgon no iron | Chemical low iron | EXP4 GAC medium iron | high iron |

CONTAMINANT ADSORPTION AND OXIDATION VIA THE FENTON REACTION

CROSS-REFERENCE TO RELATED APPLICATIONS

The present application is a continuation-in-part of Ser. No. 09/310,932 filed May 13, 1999, now abandoned, which claims priority from provisional application Serial No. 60/085,416, filed May 14, 1998, the entire contents of both of which are hereby incorporated by reference. This application also claims priority from Provisional Application Serial No. 60/205,566, filed May 22, 2000, the entire contents of which are hereby incorporated by reference.

FIELD OF THE INVENTION

The present invention is directed to a process for treating contaminated water using a combination of adsorption and oxidation.

BACKGROUND OF THE INVENTION

There are many limitations in ground water cleanup programs, which limiting factors are considered in the lifetime costs of implementing remedial actions (O'Brien et al, 1997). For this reason, permeable reactive barriers and funnel and gate systems are currently the most cost effective methods for cleaning ground water.

There are currently several chemical oxidation systems in which soil for aquifer material has been remediated using hydrogen peroxide in the Fenton mechanism. These systems include injecting hydrogen peroxide in situ, surface soil application and soil slurry reactors. Each of these systems has potential limitations which ultimately affect the feasibility of the system in treating groundwater.

Blowes et al., in U.S. Pat. Nos. 5,362,394 and 5,514,279, disclose treating contaminated water by excavating a trench in the aquifer in the path of a contaminant plume, and placing a body of active material which causes the contaminant, by chemical reaction, to change its oxidation-reduction state and to precipitate harmlessly in the body of the material. This process merely involves flowing waste through the active material without concentrating the contaminant.

Doddema et al., in U.S. Pat. No. 5,667,690, disclose a process tor treating contaminated water involving a complex of a transition metal and a polyamine in the presence of a peroxide. Doddema et al. propose that in situ treatment of contaminated water involves passing a solution of an iron-polyamine complex through the soil or material in such a way that all soil particles come sufficiently in contact with the iron-polyamine complex and peroxide. This approach essentially involves injecting a mixture of the peroxide and iron-polyamine complex into the subsurface. This involves oxidation of contaminants in the subsurface, as is. There is no adsorption of the contaminants from the aqueous phase onto reactive media followed by oxidation of the contaminants on or near the surface on which the contaminant was concentrated. Additionally, the iron-polyamine complex is not fixed to the surface of carbon particles. According to Doddema, transition metals such as iron, manganese, and cobalt can be used, and the reactions are conducted at a pH of 9.5.

Gurol, in U.S. Pat. No. 5,755,977, discloses oxidation of target contaminants in the aqueous phase. In this patent, iron is used in the mineral form as goethite, and the pH range is 5–9.

Jasim et al., in U.S. Pat. No. 5,716,528, discloses a homogeneous (aqueous phase) reaction of $Fe^{+2}$ and hydrogen peroxide to oxidize pentachlorophenol. Activated carbon is used merely for post-oxidation treatment, i.e., as a polishing step. Adsorption and oxidation occur in sequential treatment reactors.

Gilham, in U.S. Pat. No. 5,534,154, teaches primarily reductive (dehalogenation) reactions which are quite different from oxidation reactions. Reduction involves donating an electron from a reduced moiety, e.g., $Fe^0$, to a compound (contaminant).

Leachate generation is a potential limitation in surface soil application of hydrogen peroxide, resulting in the downward transport of contaminants. In soil slurry reactors, the treatment volume of contaminated soil is generally small, representing a limitation to the overall treatment process.

Competition kinetics can significantly reduce treatment efficiency and minimize effectiveness when scavengers react with hydroxyl radicals more rapidly than the target compound, as shown in Table 1. Scavenging can be minimized by using low ionic strength or low hardness make-up water for the hydrogen peroxide solution.

TABLE 1

Chemical Reactions Involving $H_2O_2$, Iron, 4-POBN, 2CP and Scavengers

| | |
|---|---|
| $H_2O_2 + Fe(II) \rightarrow Fe(III) + OH^- + \cdot OH$ | (1) |
| $H_2O_2 + Fe(III) \rightarrow Fe(II) + \cdot O_2^- + 2H^+$ | (2) |
| 4-POBN + $\cdot$OH $\rightarrow$ .4-POBN | (3) |
| 2CP + $\cdot$OH $\rightarrow$ reaction products | (4) |
| $\Sigma^n_{i-1} k_i$ | |
| $\cdot$OH + $\Sigma^n_{i-1} S_i \rightarrow$ products of scavenging reactions | (5) |
| $\cdot O_2^- + Fe(III) \rightarrow Fe(II) + O_2$ | (6) |
| $H_2O_2 + 2Mn(II) + 2H_2O \rightarrow 2MnOOH(s) + 4H^+$ | (7) |
| $H_2O_2 + 2MnOOH(s) + 4H^+ \rightarrow 2Mn(II) + O_2 + 4H_2O$ | (8) |
| catalase | |
| $H_2O_2 + O_2 + 4H_2O$ | (9) | where
- .OH — hydroxyl radical
- $.O_2^-$ — superoxide radical
- 4-POBN — spin-trap compound
- .4-POBN — radical adduct
- 2CP — 2-chlorophenol
- $S_i$ — concentration of individual scavengers
- $k_i$ — second-order rate constant (L/mol-s) for .OH with $S_i$

| Reaction | Reaction Rate Constant and General Comments |
|---|---|
| 1 | $k_i$ = 53.01 l? mol-s (Ingles, 1972), 76 L/mol-s (Walling, 1975) |
| 2 | Rate constant not reported; reaction involves soluble and solid phase iron |
| 3 | $k_3$ = 3.8 × 10$^9$ L/mol-s, pH 7 (Buxton et al., 1988) |
| 4 | $k_4$ = 1.2 × 10$^{10}$ L/mol-s (Getoff and Solar, 1986) |
| 5 | $\Sigma^n_{i-1} k_i [S_i]$ - pseudo-first-order rate constant ($T^{-1}$) for .OH scavenging by all constituents of the solution except the probe |
| 6 | $k_6$ = 2.7 × 10$^8$ L/mol-s |

Limited reaction kinetics is the condition in which low concentrations of the target compound limits the second-order oxidation reaction. Correspondingly, the clean-up goal for the target compound in the ground water can be difficult to achieve. Exacerbating the issue are the numerous scavengers which effectively compete against low concentrations of target compound for hydroxyl radicals.

While adsorption using activated carbon and oxidation using the Fenton mechanism has been widely used separately in ground water remediation and wastewater treatment, problems associated with oxidation in subsurface systems involve poor reactions kinetics, excessive scavenging and excessive non-productive hydrogen peroxide consuming reactions. Problems associated with adsorption in subsurface systems relate to exhausting the sorption capacity of carbon. To replace the carbon, it must be excavated and transported to a specialized facility for disposal. Long-term risks associated with this disposal are environmentally undesirable. If the carbon is reactivated rather than disposed of, additional costs are incurred.

Enzymatic and manganese reactions with hydrogen peroxide can consume hydrogen peroxide in reactions which do not yield hydroxyl radicals (cf. Table 1 and FIG. 2). Selection criteria for granulated activated carbon should, therefore, include low manganese content. The iron content of the granulated activated carbon can be increased to enhance the Fenton mechanism. The effect of the enzymatic reactions are relatively short term because hydrogen peroxide inhibits catalase enzyme activity via the formation of an intermediate enzyme-substrate compound (Nicholls and Schonbaum, 1963; Aggarwal et al., 1991).

SUMMARY OF THE INVENTION

It is an object of the present invention to overcome the aforementioned deficiencies in the prior art.

It is another object of the present invention to provide a method for treating contaminated water.

It is a further object of the present invention to provide a method for treating any waste stream which includes compounds which adsorb and can be oxidized by the hydroxyl radical.

For the purposes of the present invention, the term "contaminated water" includes any water, waste stream, or ground water which has compounds which adsorb and can be oxidized by the hydroxyl radical.

According to the present invention, contaminated water is treated by first adsorbing contaminates onto a suitable non-treated sorbent and subsequently oxidizing the compounds near the surface of the sorbent. In one embodiment, contaminants are adsorbed onto activated carbon containing iron, or which has been amended with iron in solution, which concentrates contaminants from the contaminated water onto the reactive medium. Hydrogen peroxide or other oxidizing agent is then added, which reacts with iron to generate hydroxyl radicals which oxidize the adsorbed contaminants.

In the process of the present invention, contaminants are oxidized using a Fenton-driven mechanism and destroyed in situ, and the sorbent is reactivated/regenerated in situ. That is, the contaminants which can be treated by the process of the present invention are substances which can be oxidized by hydroxyl radicals through the Fenton mechanism. This process makes it possible to treat mixed wastes. For example, benzene, xylene, toluene, and halogenated compounds such as 2-chlorophenol can be treated in the same waste stream, whereas conventional zero-valent iron treatment only involved dehalogenation. The adsorption/oxidation system of the present invention provides for adsorbing and oxidizing contaminants on the sorbent surface. This process is also much more efficient that conducting the Fenton reaction in bulk liquid.

Adsorption immobilizes and concentrates the contaminants onto the iron-treated sorbent. Treatment involves adding an oxidizing agent to the surface or solution of the iron-treated sorbent, which produces hydroxyl radical as a reaction intermediate. The hydroxyl radical oxidizes the contaminants sorbed to or very near the surface of the iron-treated sorbent. This treatment process overcomes some of the limitations of other chemical oxidation processes involving oxidation of contaminants.

BRIEF DESCRIPTION OF THE DRAWINGS

FIG. 1 is a schematic of the adsorption/oxidation process of the present invention.

DETAILED DESCRIPTION OF THE INVENTION

Figure 1A:
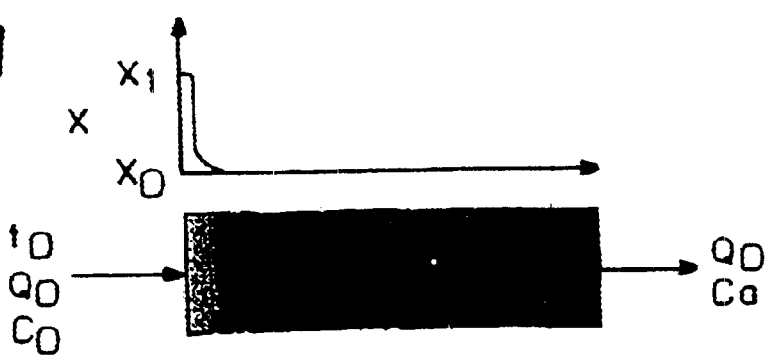
FIG. 1A shows the initial time and concentration and the flow ($Q_0$) of water containing contaminants at an initial concentration ($C_0$) into the sorbent/iron medium, which results in contaminant adsorption to the granulated activated carbon yielding an acceptable effluent concentration ($C_a$).
Figure 1B:
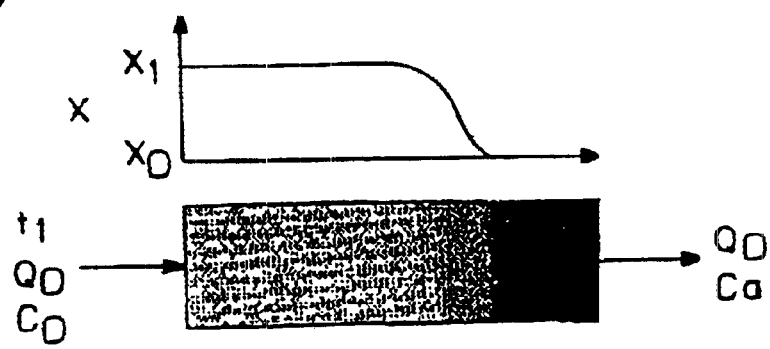
FIG. 1B shows that contaminants concentrate on the carbon/iron medium and reach an equilibrium concentration ($X_i$).
Figure 1C:
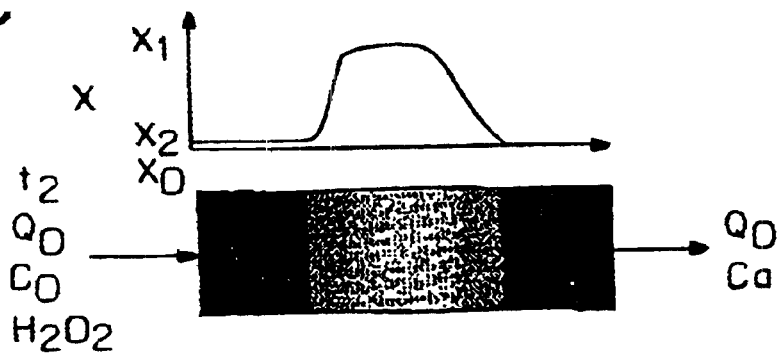
FIG. 1C shows that hydrogen peroxide perfused into the carbon/iron medium initiates the Fenton mechanism. This results in the formation of hydroxyl radicals, which oxidizes sorbed contaminants, thus decreasing the concentration of contaminants and regenerating the granulated activated carbon ($X_2$).
Figure 1D:
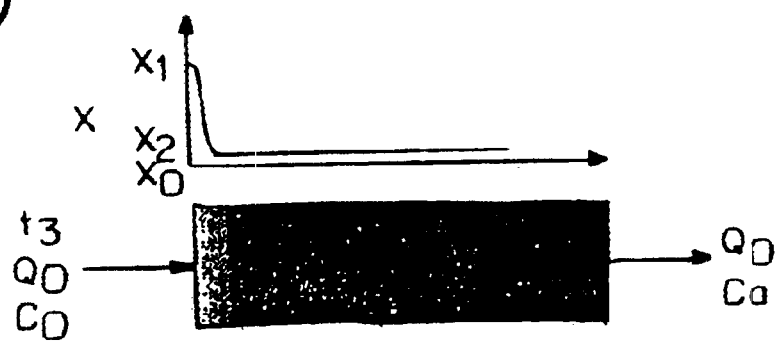
FIG. 1D shows cessation of hydrogen peroxide application and contaminated water continuing to flow through the reactive medium for another cycle.

Contaminated water is treated by a combination of adsorption of organic compounds in the water onto a sorbent to concentrate the contaminates and subsequent oxidation on the sorbent. This process is illustrated schematically in FIG. 1. Contaminated groung water flows ($Q_0$) through a granulated activated carbon bed where contaminates adsorb onto the carbon. This results in acceptable concentrations of contaminates ($C_A$) in the effluent. Subsequently, the purified water continues through the treatment unit and back into the aquifer (FIG. 1A). Adsorption immobilizes and concentrates the contaminants onto the sorbent, which also contains iron which is capable of facilitating Fenton-driven oxidation reactions. Prior to breakthrough of contaminants from the reactive granulated activated carbon (FIG. 1B), an oxidant, such as hydrogen peroxide, is injected, which reacts with iron, generating a strong oxidant, the hydroxyl radical. The hydroxyl radical oxidizes sorbed contaminants (FIG. 1D). Ideally, the sorbent is treated in situ, and the sorption capacity of the sorbent is regenerated (FIG. 1D). The application of oxidant is performed at appropriate intervals to maintain an acceptable concentration in the contaminated water passing through the reactive unit.

The process of the present invention can be used to treat contaminated water in situ or in a specially constructed container. The process can be used above ground or below ground. For treating groundwater, the water treatment system can be constructed entirely below grade and can be entirely gravity driven, all of which reduces operation and maintenance costs. The system is easily monitored.

A broad range of water contaminants, including halogenated solvents, polycyclic aromatic hydrocarbons, petroleum constituents, etc., have a sufficiently high reaction rate constant with hydroxy radical and thus are valuable target compounds to be oxidized. Because there are so many contaminants that have a sufficiently high reaction rate constant with hydroxyl radical that they can be oxidized by the present process, the treatment method of the present invention has wide application.

The classic Fenton reaction specifically involves the reaction between $H_2O_2$ and ferrous iron [(Fe(II)] to yield a hydroxyl radical (.OH) and ferric iron [(FeIII)], the first reaction shown in Table 2. Ferric iron, a by-product from this reaction, can react with $H_2O_2$ or the superoxide radical (.O2—), yielding ferrous iron (reaction 2 in Table 2), which can in return react with $H_2O_2$. Overall, however, in mot remediation systems, Fe(II) is the limiting moiety, since the reduction of Fe(III) is slow and addition of Fe(II) is problematic.

Treating contaminated water according to the present invention involves four main processes: advection, adsorption, reduction, and oxidation. That is, the treatment includes:

Advection of contaminated water through the treatment unit;

Adsorption of the contaminants onto the reactive media;

Reduction of the metal catalyst (i.e., Fe), addition of $H_2O_2$ to facilitate the Fenton reaction, .OH production, and subsequently, Oxidation of the contaminants by .OH on or near the surface of the reactive media (reaction 3 in Table 2). This adsorption/reduction/oxidation treatment process can be used in both above- and below-ground water and wastewater treatment systems.

The treatment process of the present invention is designed to enhance Fenton oxidation by increasing the Fe(II) available for the Fenton reaction. This is accomplished by adding a reductant such as sodium dithionite or hydroxylamine to reduce Fe(III) to Fe(II). For example, sodium dithionite ($Na_2S_2O_4$) dissociates to the hydrosulfite ion ($S_2O_4^{2-}$) (reaction 4), and then to two sulfoxyl radicals ($.SO_2^-$) (reaction 5). The sulfoxyl radicals then reduce Fe(III) to Fe(II) and reduces species of sulfite ($SO_3^{2-}$) or bisulfite ($S_2O_3^{2-}$) (reaction 6). There are several potential reductants that can be applied to reduce Fe(III). The addition of a reducing agent can be used in conjunction with Fe(II) or Fe(III) amendments to the reactive media.

Contaminated water flows through the reactive media, which comprises a sorbent, such as activated carbon. The contaminants adsorb on the activated carbon, resulting in purified water in the effluent of the unit. Contaminants are adsorbed, immobilized, and concentrated onto the activated carbon, which also contains iron capable of facilitating Fenton-driven oxidation reactions. Prior to oxidation, a reductant, such as sodium dithionite or hydroxylamine, is introduced into the activated carbon that reduces the iron oxides from (Fe(III) to Fe(II). The reduced form of iron, i.e., Fe(II), can participate in the Fenton reaction. Hydrogen peroxide, or other oxidizing agent that produces a hydroxyl radical, is introduced into the activated carbon and reacts with the Fe(II), yielding a hydroxyl radical (.OH), which subsequently oxidizes contaminants on or near the surface of the activated carbon. Ideally, the contaminant is oxidized and the activated carbon is regenerated. The reduction/oxidation steps can be repeated to accomplish the desired level of contaminant oxidation.

Currently, laboratory results have been obtained which demonstrate that enhancing the Fenton oxidation of MTBE in activated carbon with sodium dithionite or hydroxylamine is effective. The Fe(III) is reduced to (Fe(II), and subsequently is a reactant in the Fenton reaction. The extent of oxidation was greater than the base case involving hydrogen peroxide without a reductant.

Also, in a Fenton system, there are many reaction which occur simultaneously. For example, there are oxidation and reduction reactions involving the target contaminant(s) and other chemical intermediates which collectively degrade the target contaminant(s) to more acceptable products. Although each of these reactions has not been definitively identified, they are a part of the overall Fenton mechanism, as shown in Table 2.

TABLE 2

Chemical Reactions Involving Fenton Chemistry of Sodium Dithionite and Reduction of Fe (III)

| | |
|---|---|
| $H_2O_2$ + Fe (II) → Fe (III) + OH$^-$ + .OH | (1) |
| $H_2O_2$ + Fe (III) → Fe (II) + .O$_2^-$ + 2H$^+$ | (2) |
| .OH + Organic Compounds → Products (CO$_2$, Cl$^-$, etc.) | (3) |
| Na$_2$S$_2$O$_4$ → 2 NA$^+$ + S$_2$O$_4^{2-}$ | (4) |
| S$_2$O$_4^{2-}$ → 2 .SO$_2^-$ | (5) |
| 4 .SO$_2^-$ + ≡ Fe (III) → ≡ Fe (II) + 2SO$_3^{2-}$ + S$_2$O$_3^{2-}$ | (6) |

Oxidation

As described above, the Fenton mechanism, hydrogen peroxide reacts with Fe(II) to yield hydroxyl radical and Fe(III), as shown in Table 1, Reaction 1. The Fe(III) is reduced to Fe(II) via reaction with hydrogen peroxide, as shown in Table 1, Reaction 2. Reactions 1 and 2 cycle iron between the ferrous and the ferric oxidation states, producing hydroxyl radicals continuously until the hydrogen peroxide is fully consumed. These reactions may involve either dissolved iron (homogeneous reactions) or solid phase iron oxides (heterogeneous reactions). Since the hydroxyl radical is a powerful oxidant and reacts with compounds at near diffusion- controlled rates (Walling, 1975; Haag and Yao, 1992), hydrogen peroxide has been used to generate hydroxyl radical and oxidize undesirable contaminants in soils and aquifers (Watts et al., 1993; Ravikumar and Gurol, 1994; Yeh and Novak, 1995).

Reactions 1 and 2 indicate that the overall Fenton mechanism is acid generating. pH affects hydrogen peroxide stability (Schumb et al., 1955) and iron solubility. Oxidation efficiency is optimum under acidic conditions (Watts et al., 1991). In any oxidation system involving Fenton-derived hydroxyl radical, pH should be monitored, and steps taken to mitigate acidic conditions.

A similar reaction involving the hydrogen peroxide oxidation/reduction cycling of $Mn^{2+}$ and $MnOOH(s)$ is thermodynamically favorable (Pardiek et al., 1992) and kinetically fast, but does not yield hydroxyl radical, as shown in Table 1, Reactions 7 and 8. Naturally-occurring soil microorganisms contain enzymatic catalysts, such as catalase and peroxidase, which also readily decompose hydrogen peroxide without producing the hydroxyl radical. The reactions between manganese or enzymatic catalysts and hydrogen peroxide reduce the amount of hydrogen peroxide available for Fenton reactions. Numerous non-target chemical species present in solid and aquifers, both naturally occurring (i.e., $CO_3^{2-}$, $HCO_3^-$, $Cl^-$, etc) and anthropogenic (i.e., $H_2O_2$, mixed waste constituents, etc.), will also react with hydroxyl radical. The non-target chemical species scavenge hydroxyl radical which would otherwise oxidize the target contaminants. Hydrogen peroxide is generally present at high concentrations in Fenton systems and has a moderate reaction rate constant ($2.7 \times 10^7$ L/mol-s; Buxton et al., 1988) and, therefore, is responsible for scavenging a significant fraction of hydroxyl radical produced in Fenton systems.

Oxygen is a significant byproduct of reactions involving hydrogen peroxide is soils or aquifers. Reaction 6 in Table 1 indicates that $O_2^-$ reacts with $Fe(III)$ to yield $O_2$. In aqueous systems, the rapid rate of degradation of high concentrations of hydrogen peroxide, in conjunction with the relatively low solubility of dissolved oxygen, the formation of bubbles, i.e., oxygen gas, is certain. In the field applications of Fenton systems, the formation of gaseous oxygen in porous media may result in gas blockage of fluid flow.

A wide range of organic compounds of environmental significance and their reaction rate constants with hydroxyl radical have been reported (Haag and Yao, 1992; Buxton et al., 1988; Dorfman and Adams, 1973). Organic compounds that are common ground water and soil contaminants as Superfund Sites have relatively high reaction rate constants (i.e., $10^8$–$10^{10}$ L/mol-s), indicating their potential for oxidation by hydroxyl radical.

Adsorption

Any type of sorbent may be used in the process of the present invention, depending upon the contaminants to be removed from the water. The criteria for the sorbent are that it be capable of concentrating the contaminant sought to be treated/removed, and that it provide iron in some form for the Fenton mechanism during oxidation of the contaminant. The primary role of granulated activated carbon, as of any sorbent, in the process of the present invention is to immobilize and concentrate target compounds on the same surface on which the hydroxyl radical is produced. Subsequently, the target compounds on or near the surface of the sorbent are oxidized. In addition to activated carbon, which can be granulated, powdered, etc., sorbents for use in the process of the present invention include ion exchange resins, both anionic, cationic, or both, zeolites and other molecular sieves, alumina, silica, silicates, aluminum phosphates, and the like. One skilled in the art can readily determine which adsorbent is effective in adsorbing and concentrating a particular contaminant.

Granulated activated carbon is a preferred sorbent for removing organic compounds from waste streams. For example, the pore size distributions and surface chemistry for a given granulated activated carbon are directly related to the starting raw material and the activating conditions. pH and concentration of transition metals in the carbon vary and, therefore, affect the reactivity of oxidants in granulated activated carbons.

The oxidant can be any conventional oxidizing agent that works through the Fenton mechanism for oxidizing contaminants. While hydrogen peroxide has been illustrated in the specific examples, any other oxidizing agent that produces hydroxyl radicals in the presence of iron can be used, including ozone, permanganate salts, persulfate salts, and the like.

Iron can be added to the sorbent to enhance the Fenton mechanism and, therefore, enhance hydroxyl radical production. The amount of iron will affect the ability to carry out Fenton reactions and, therefore, the iron concentration of the sorbent can be optimized. For example, the concentration of iron may be adjusted so that the density of iron sites (i.e., the spatial distribution of hydroxyl radical production sites) is similar to the density of sorption sites on the sorbent to assure the spatial probability of hydroxyl radical and contaminant interaction. One method of iron attachment to a sorbent involves raising the pH using a sodium hydroxide solution to precipitate ferric iron in the pores of the sorbent. Additionally, the use of other forms of iron and the use of chelators and ligand agents can be used to attach iron to sorbent surfaces. Alternatively, a solution of iron and oxidant can be perfused through the sorbent to oxidize contaminants adsorbed thereto.

The adsorption/oxidation process and associated enhancement steps described above is, thus, used in systems in which contaminated water can be diverted through a sorbent/iron treatment unit. Details of an adsorption/oxidation treatment process are provided below in the context of a hydraulic barrier in conjunction with a carbon/iron treatment unit, but this example is for illustrative purposes only and is not limiting of the invention. This treatment process can also be used in above-ground treatment systems and be constructed in existing or planned containment systems to serve as a pressure release mechanism to improve hydraulic control. For example, a containment system or hydraulic barrier can be designed to leak while meeting stringent ground water quality criteria. Other applications include a below grade pump and treatment system, a passive landfill leachate treatment system, or any above ground treatment process.

Field Application in a Hydraulic Barrier/Treatment Unit

Flow blockage through the granulated carbon/iron medium may be a limitation of the process. For example, the reaction product oxygen (Reactions 6, 8 and 9 in Table 1) will result in gas formation which may fill the void spaces and inhibit water flow. This problem can be avoided using an upflow regimen allowing gaseous oxygen bubbles to rise in the carbon/iron unit and escape into the headspace of the unit or distribution gallery and into the air. Manganese oxide may be used to ensure that all hydrogen peroxide is consumed after it leaves the reactive media. This step minimizes the introduction of hydrogen peroxide into the distribution gallery. Biofouling may occur because of the high surface area and substrate concentration associated with the granulated activated carbon. However, biofouling in injection wells for in situ bioremediation have been remedied with hydrogen peroxide and, therefore, may not be a problem. Precipitation of solid phase material may result in fouling of the carbon/iron unit. The occurrence of this potential problem will be site specific. Precipitation may be eliminated by treatment with dilute acid. Alternatively, since the Fenton mechanism is acid generating, this may be sufficient to dissolve any precipitate which forms on the granulated activated carbon. The acid generating Fenton mechanism may release excess acid from the treatment unit. Two approaches are described below which may be used to maintain a constant pH from the treatment unit. While potential limitations on the process exist, the potential effects on treatability, operation and maintenance and the associated costs must be evaluated on a site-specific basis.

Limited treatment volume, hydroxyl radical scavenging, low reaction kinetics, and non-productive hydrogen peroxide consumption may reduce the effectiveness of hydrogen peroxide application in soil slurry reactors. These limitations are minimized in the treatment system of the present invention. For example, contaminants partition from the ground water onto the carbon/iron medium, thus achieving stringent treatment criteria. Through this process, contaminants are concentrated on the carbon/iron reactive medium which enhances reaction kinetics. Further, hydrogen peroxide is applied in a scavenger-reduced solution to minimize the role of scavengers in the treatment unit. Flow blockage and pH reduction may also result, but design options can be implemented to minimize these potential limitations.

Sorption/Oxidation System Design

Figure 2:
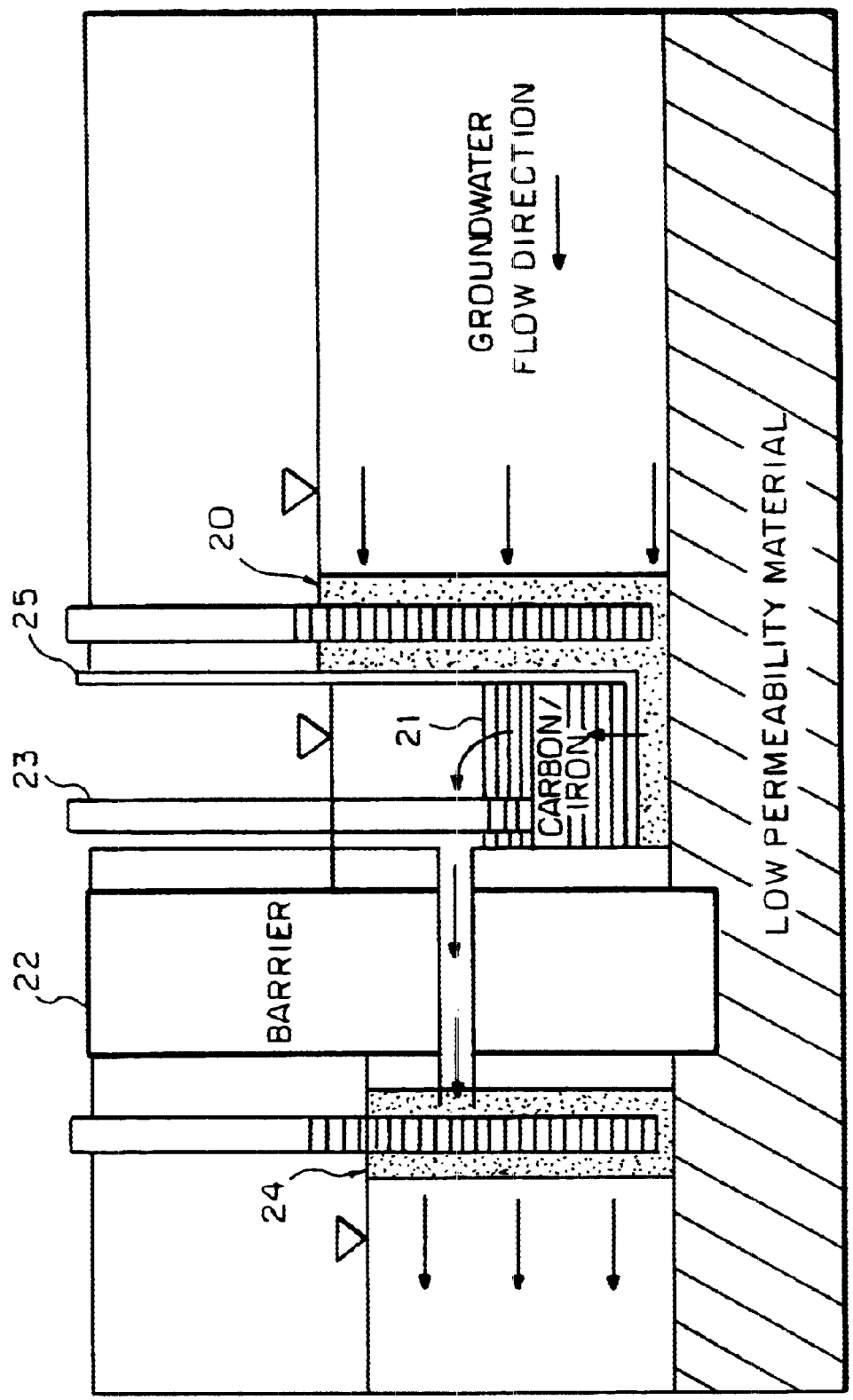
FIG. 2 is a cross-sectional diagram of a hydraulic barrier and adsorption/oxidation treatment unit. This illustrates another embodiment in which the method can be used in an in-situ passive scenario
Figure 3:
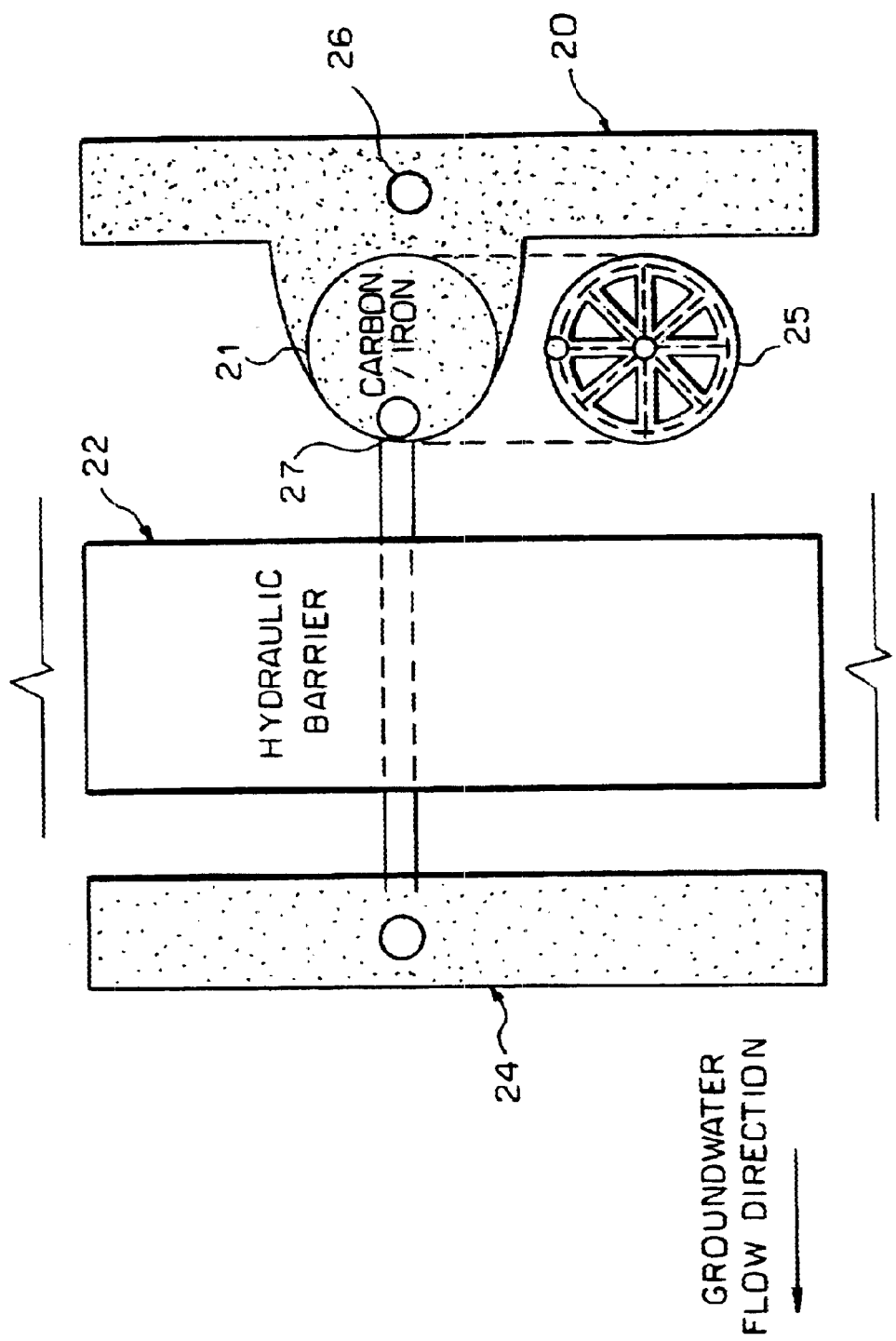
FIG. 3 is a plan-view diagram of a hydraulic barrier and adsorption/oxidation treatment unit.
Figure 4:
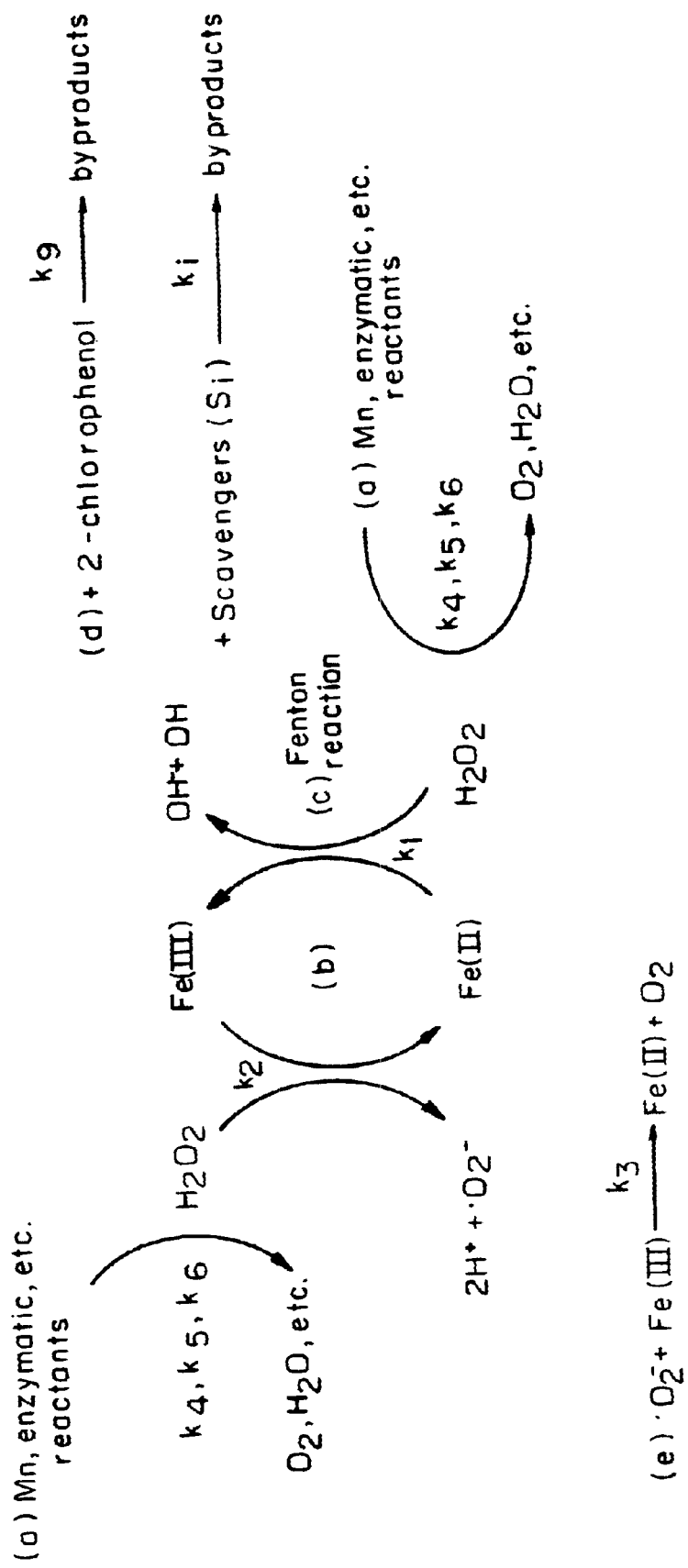
FIG. 4 is a schematic of hydrogen peroxide reactions in soil slurry containing 2-chlorophenol. (a) is non-hydroxyl radical producing reactions; (b) is cycling between Fe(II) and Fe(III) oxidation states; (c) is production of hydroxyl radical via the Fenton reaction; (d) is competition between 2-chlorophenol and scavengers ($S_i$) for hydroxyl radical; and (e) is the reduction of Fe(III) via the superoxide radical.
Figure 5:
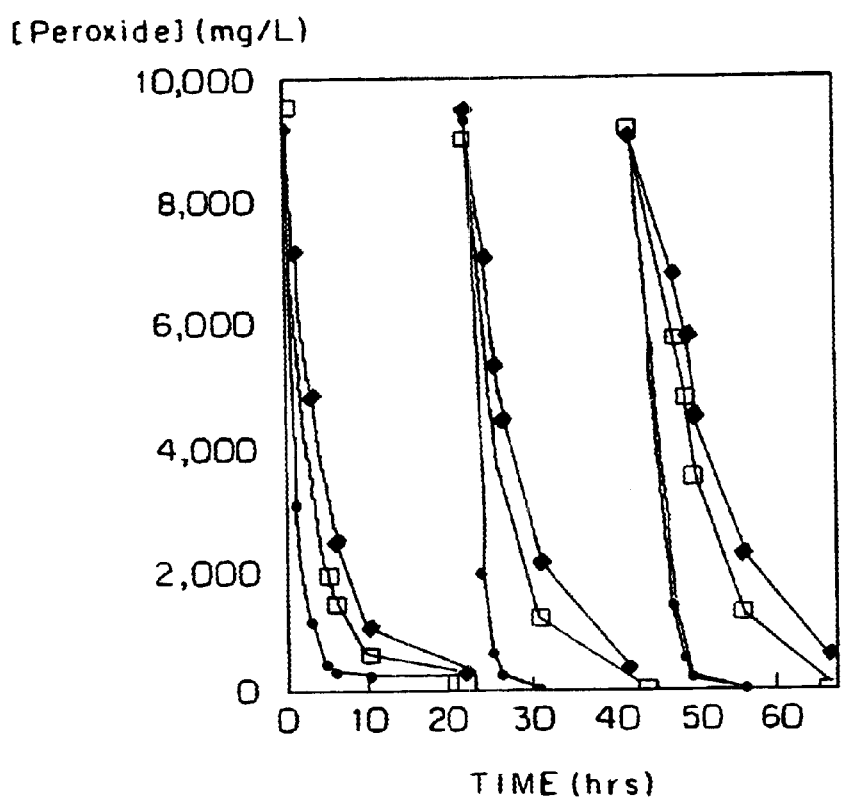
FIG. 5 shows time-dependent concentrations of hydrogen peroxide in batch reactors containing different types of granulated activated carbon with three successive applications of 100 mL 0.9% hydrogen peroxide into 1 g granulated activated carbon with [2CP]=35.4 g/Kg.
Figure 6:
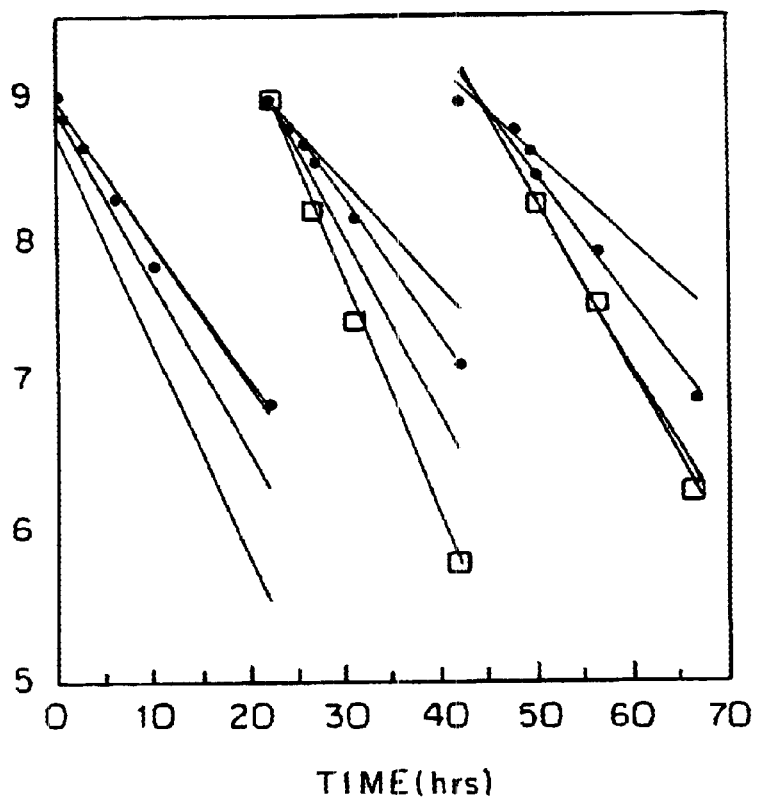
FIG. 6 shows time-dependent concentrations of hydrogen peroxide in batch reactors containing granulated activated carbon with different concentrations of iron (none, low, medium, high, containing 24.0, 5500.0, 9790.0, 12050.0 mg/Kg total iron, respectively); three successive applications of 100 mL 0.9% hydrogen peroxide into 1 g granulated activated carbon with 2CP=35.4 g/Kg.
Figure 7:
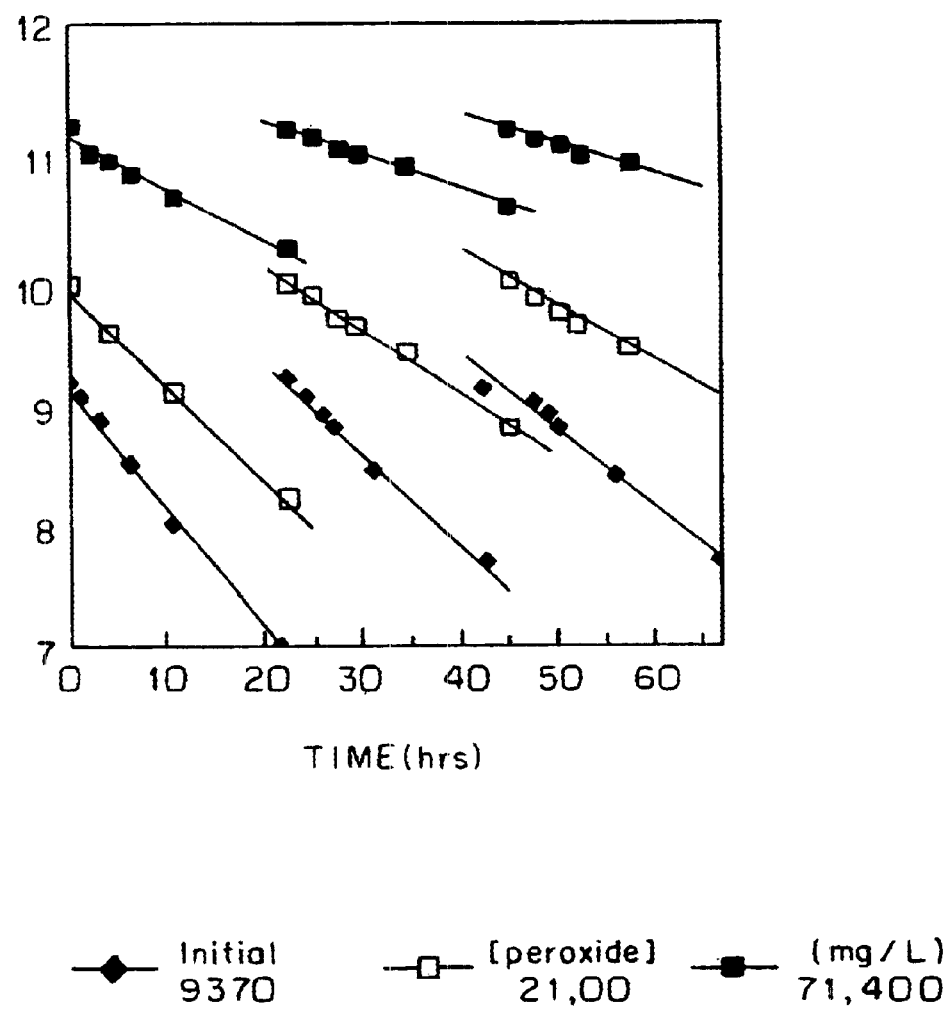
FIG. 7 shows time-dependent concentrations of hydrogen peroxide in batch reactors containing granulated activated carbon, Fe=5500.0 mg/Kg, with different initial concentrations of hydrogen peroxide (9370, 21400, 71400 mg/L, respectively. Three successive applications of 100 mL 0.9% hydrogen peroxide into 1 g granulated activated carbon with 2CP=35.4 g/kg.

Cross-section and plan-view diagrams of a hydraulic barrier and treatment unit according to the present invention illustrate the hydraulic and treatment components of the proposed system, as shown in FIGS. 2 and 3. Contaminated water flowed into a gravel-filled collection gallery 20 and was directed through the carbon/iron treatment medium 21. The ground water then passed through the hydraulic barrier 22 via a pipe 23 and back into the aquifer, through a gravel filled distribution gallery 24. The collection and distribution galleries facilitate water flow since head loss is minimized in gravel relative to the head loss through the porous medium. The combined head loss through the alternative flow regimen must be less than the head loss of the original flow regimen to ensure continuity and to minimize ground water flow stagnation. For example, the equivalent porous medium of the alternative flow regimen is comprised of the collection/distribution galleries, pipe flow, and treatment unit. The influence of the hydraulic barrier, collection/distribution galleries and treatment unit on the water gradient, flow pattern and capture zone must be evaluated on a site-specific basis.

Using contaminated ground water as an example, ground water flow in the pipe through the hydraulic barrier provides minimal disturbance to the wall. Since the system can be constructed below ground and is gravity driven, it is not subject to freezing or power outages (O'Brien et al, 1997). The granulated activated carbon/iron medium can be readily accessed for sampling or replenishment if necessary. Because of the oxidation of sorbed contaminants, ideally the granulated activated carbon is regenerated in situ, and replenishment may be unnecessary. The granulated activated carbon/iron medium can be slurried, pumped and remixed in the treatment unit if recycling of the granulated activated carbon/iron medium is determined to be beneficial.

Contaminants adsorbed to the carbon/iron medium were oxidized via hydrogen peroxide perfusion at selected intervals. Hydrogen peroxide was introduced by gravity into the system through a port at the surface which leads to a slotted distribution header 25 at the bottom of the carbon/iron unit. Gaseous oxygen formed in the carbon/iron unit will rise because of buoyancy and will escape into the headspace of the reactor unit, where it is vented into the atmosphere. The particle size of the activated carbon should be large enough to ensure mobility of gas bubbles in the carbon/iron medium and to minimize head loss. Assuming oxygen bubbles are diverted to the distribution gallery, an open chamber can be designed which will allow separation of bubbles and water. Passive gas capture and venting designs may also be used. It is undesirable to introduce hydrogen peroxide into the gravel-filled distribution gallery, since hydrogen peroxide decomposition and oxygen blockage may result. To ensure that hydrogen peroxide is degraded prior to leaving the reactor unit, a layer of manganese oxide ore or manganese-rich granulated activated carbon can be installed above the carbon/iron bed to rapidly decompose the remaining hydrogen peroxide and ensure that no hydrogen peroxide will be introduced into the distribution gallery.

Laboratory results indicate that the Fenton mechanism is an acid-generating process. This is consistent with Reactions 1–2 shown in Table 1, which indicate a net production of hydrogen ion. Acid production may be problematic, and its control at field scale may be advantageous. Different approaches can be used to control the pH in the oxidation system. A layer of limestone placed on top of the sorbent/iron unit and/or in the distribution gallery will neutralize a low pH solution. Another pH control method uses an automated pH-stat. This system comprises continuous pH measurement and adjustment of pH using an acceptable source of base, such as sodium hydroxide. It is important to note that oxidant perfusion into the treatment unit occurs infrequently, and the volume of water relative to the volume of water between oxidation events is small. Therefore, pH control may be necessary only when the treatment unit is undergoing oxidation. One option, of course, is simply to remove the solution containing spent oxidant for disposal or treatment elsewhere.

Monitoring treatment performance involves an upgradient well in the influent area and one downgradient well in the effluent area. A well 26 in the upper treatment unit could be useful for obtaining ground water quality data on the treatment unit. Specifically, monitoring for the contaminant provides information on breakthrough of the carbon/iron unit and indicates when oxidation is required. This information is helpful in establishing an oxidation schedule. Further, assuming halogenated contaminants were present, monitoring chlorides concentration in the treatment bed using monitoring well 27 during an oxidation treatment is useful in determining when oxidation is complete. For example, assuming the treatment bed is operated in batches or continuously, chloride concentration would eventually diminish as sorbed contaminants are oxidized. This simple monitoring system can be used to verify that the water quality leaving the treatment unit satisfies ground water quality cleanup goals.

Oxidation of sorbed contaminant occurs when an oxidant is perfused through the sorbent/iron unit. This is accomplished by, for example, introducing hydrogen peroxide into a port at the surface. The hydrogen peroxide then flows downward and out of a slotted distribution header and into the sorbent/iron media, as shown in FIGS. 2 and 3. Perfusing hydrogen peroxide can be effected either in continuous flow or in batch modes. The sorption/oxidation treatment system can be designed as two parallel units. For example, when hydrogen peroxide is perfused through one sorbent/iron unit, contaminants in the water can be treated via the second sorbent/iron unit. This provides the flexibility of operating one unit in a sorption mode and one unit in an oxidation/standby mode to ensure complete use of hydrogen peroxide. Other design configurations are also possible, such as series, batch, or continuous. The design options are also applicable to above-ground treatment systems.

The frequency at which oxidant is applied and the concentration depends on the mass loading rate, the mass of sorbent and treatment efficiency. The treatment efficiency depends on numerous parameters, including pH, hydrogen peroxide concentration, iron concentration, contact time, scavenging, non-productive oxidant degradation reactions, reaction rate constants, concentration of target compounds, etc. These parameters vary significantly from site to site, and the frequency necessarily reflects such variability.

There are several advantages to adsorbing contaminants in contaminated water onto iron amended sorbent and subsequent oxidation via the Fenton mechanism. In situ treatment of contaminants minimizes water pumping and associated costs. The process involves contaminant destruction, not simply mass transfer onto the sorbent, which requires subsequent handling for transport and treatment or disposal. Ideally, the sorbent is regenerated each time oxidant is applied, although the sorption capacity will not be completely restored to that of virgin sorbent. Mixed wastes can be sorbed and oxidized, since a wide range of organic compounds sorb to activated carbon and react with hydroxyl radical. Since co-disposal of organic compounds is common, a ground water plume comprised of contaminants, such as halogenated volatiles, polycyclic aromatic hydrocarbons, and fuel compounds (BTEX), can be treated together. Significant process control can be achieved in the system, including concentration and hydraulic retention time of oxidant and type of sorbent (particle size, oxidant reactivity, manganese content, contaminant sorption, iron concentration, etc.). Performance monitoring can be simplified since ground water wells can be placed directly in the collection and distribution galleries for pre-treatment and post-treatment evaluation, respectively. Significant treatment efficiency can be obtained, since the process involves a concentration step, minimizes the role of scavengers, and optimizes pH, since many oxidants can be used in dilute solution and since the Fenton mechanism is acid generating. The entire system can be gravity driven, including the delivery of oxidant. Thus, there need be no above-ground structures and iron, oxidants and sorbents are relatively inexpensive. This collectively minimizes costs.

The loss of iron in the sorbent may potentially be a concern in low pH or redox conditions. Preliminary experiments indicate that iron mobility does not occur except at pH<2.5. Assuming the pH in the treatment unit is maintained above 3, iron mobility can be limited. Iron contained in the mineral matrix of carbon is immobile relative to iron amended to the carbon.

Another potential problem may result in ground water contaminated with $Cr^{3+}$. Assuming $Cr^{3+}$ is present in contaminated water, it may possibly accumulate in the treatment unit and be oxidized to $Cr^{6+}$ upon application of hydrogen peroxide. This may increase the mobility and toxicity of chromium. It may be preferable to avoid treating water that is contaminated with such heavy metals by the process of the present invention.

Methods, Materials, and Analytical Procedures

Sorption

The reactors used were 125 mL Ehlermeyer flasks containing 1.0 gram granulated activated carbon and 40 mL 6 mM solution of 2-chlorophenol. The reactors were placed on an orbital shaker table for 24 hours, which allowed complete (>99%) sorption of 2-chlorophenol. The granulated activated carbon slurry was decanted, and the solutions were analyzed for chloride ion, 2-chlorophenol, and total iron ($Fe_T$)

Oxidation

The remaining granulated activated carbon was amended with 100 mL hydrogen peroxide, of 0.7%, 0.9%, 1.2%, or 7.2%, w/w concentration, or deionized water in three successive applications, unless otherwise noted. The reactors were wrapped in foil to prevent photodecay, covered with parafilm to minimize volatile losses and evaporation, and placed on an orbital shaker table at 100 rpm. The granulated activated carbon slurry was decanted, and the solution was analyzed for hydrogen peroxide, chloride ion, 2-chlorophenol, and $Fe_T$. Control reactors containing granulated activated carbon and hydrogen peroxide, but not 2-chlorophenol, were used to measure background chloride ion. The pH of 2-chlorophenol control solutions was adjusted to between 2 and 7 and the solutions were analyzed for 2-chlorophenol. These data indicated no transformation.

The granulated activated carbon slurry pH was measured by placing a pH probe (Orion Sure-Flow ROSS Combination pH) into the slurry for five minutes to instrument stabilization. Samples were collected by pipetting 1.5 mL from a completely mixed suspension and filtered using a Gelman 0.2 μm filter which stopped all reactions and removed colloidal particles interfering with subsequent analyses. Hydrogen peroxide was measured immediately, and 2-chlorophenol subsamples were stored at 4° C. for analysis when the experiment was completed. The 2-chlorophenol was obtained from Aldrich Chemical. EXP3 granulated activated carbon is commercially available bituminous-based carbon obtained from Calgon Chemical Corp. (Pittsburgh, Pa.). EXP4 granulated activated carbon was derived from the same stock of Bakers carbon but was activated differently to minimize degradation of hydrogen peroxide (Rich Hayden, personal communication, 1997). Two additional granulated activated carbons were obtained from Norit America, Inc., Pryor, Okla. (type A4) and Carbochem, Inc., of Haverfers, Pa., (type LQ-900S). The particle size distribution was 8×30 for all granulated activated carbons.

The iron content of Calgon Chemical Corp. (special) granulated activated carbon was enhanced at low, medium, and high concentrations by mixing 15 grams granulated activated carbon into solutions comprising 38 mL and 0.744, 3.73, and 6.44 grams $FeSO_4 \cdot 7H_2O$, respectively. Ferrous iron was precipitated by adjusting the acidic solution to pH 5.5 with sodium hydroxide. The slurry of granulated activated carbon and iron was filtered and rinsed with deionized water through a number 35 sieve which retained>99.99% of the granulated activated carbon. The granulated activated carbon was air dried and placed into 40 mL glass vials until used. Representative samples of the granulated activated carbon/iron stock were analyzed by inductively coupled argon plasma after metals were extracted from the granulated activated carbon by digesting a 0.25 gram sample in 40 mL of 19% nitric acid for 40 minutes in a microwave oven at 150° C. and 145 psia.

Analyses of 2-chlorophenol were performed by a Waters high performance liquid chromatography Alliance Separations Module (Model No. 2690) using a Waters 996 Photodiode Array detector and a Nova-Pak C18 stainless steel column. The mobile phase was 30% acetonitrile and 0.3% acetic acid in deionized water, the flow rate was 1.0 L/min, and the injection volume was 199 μL. The wavelength used was 200 nm and the average retention time was 5.5–5.8 minutes. The 2-chlorophenol standard curve ranged from 0 to 400 μM, $r^2$=0.999, 0.14 μM detection limit. Check standards, blanks, duplicates, and spikes were run with each sample set, and the analytical quality was found to be in control.

Hydrogen peroxide was analyzed using a modified peroxytitanic acid calorimetric procedure. Hydrogen peroxide standards ranged from 0–3 mM, $r^2$=0.999, detection limit= 0.1 mg/L; 0.9 mL of the standard hydrogen peroxide solution was added to 0.1 mL of titanium sulfate reagent and allowed to react for one hour. Appropriate dilutions were made of solution where the concentration exceeded the range of the reported calibration curve. Filtered granulated activated carbon slurry samples in triplicate were prepared in a similar manner. Absorbance of the hydrogen peroxide-titanium sulfate mixture was measured at 407 nm ($A_{407}$) using a Milton Roy Spectronic 401 spectrophotometer. Regression analysis of the spectrophotometric response and the hydrogen peroxide concentration yielded a standard curve with an analytic equation of [$H_2O_2$] (mg/L)=44.5 $A_{407}$, $r^2$=0.999. Titanium sulfate reagent was obtained from Pfaltz and Bauer, Inc., and the 30 w/w % aqueous solution of hydrogen peroxide was from the Aldrich Chemical Company. Chloride ion was analyzed by Waters capillary electrophoresis method N-601 Cl. Iron was analyzed by EPA Method No. 3500-Fe D, Phenanthroline method. Transformation products of 2-chlorophenol on the granulated activated carbon were identified using gas chromatography and mass spectroscopy. This analysis involved a derivatization technique using N-methyl-N-[(tert-butyldimethyl)silyl] trifluoroacetaminde from Aldrich Chemical Co., Milwaukee, Wis., which yielded tert-butyl-dimethylsilyl ethers and esters (Heberer et al, 1997; Mawhinney 1983; Mawhinney et al, 1986). For each treatment, 100 μL of acetonitrile and 100 μL of N-methyl-N-[(tert-butyldimethyl)silyl]trifluoroacetaminde were added to 10 mg of the granulated activated carbon sample. This mixture was heated for one hour at 60° C. 2-chlorophenol, carbonic acid, sulfuric acid, and eleven dioic and hydroxy acids were derivatized to confirm the identification of the reaction products. Derivatized extracts were injected into a Finnigan 4600 gas chromatograph/mass spectrometer. A Hewlett Packard 7673 autoinjector delivered 1.0 μL of the extract under splitless conditions onto a J&W Scientific, DB5-MS capillary column (60 m; 0.25 mm id; 0.25 μm film thickness). The column was temperature programmed from 100° C. to 300° C. at 6° C./minute. The mass spectrum was scanned from 42 to 650 m/z in 0./5 seconds. The injection and transfer oven temperatures were 275° C.

The treatment ratio, T.R., was calculated as the ratio of moles of contaminant oxidized to the number of moles $H_2O_2$ consumed over the same time frame (i.e., $\Delta Cl^-/\Delta H_2O_2$). The number of moles of 2-chlorophenol oxidized was assumed to be stoichiometrically 1:1 to chloride ion measured in solution and corrected for background.

Results

The concentration of total iron and manganese in commercially available granulated activated carbon varied significantly, from 24.0 to 5520 mg/Kg and 0.55–94.3 mg/Kg, respectively, as shown in Table 3. These data also indicated that total iron can be significantly increased, i.e., by a factor of 230–500.

Metals analyses data indicate that total Fe was significantly increased using the Fe precipitation method (Table 2). Total Mn concentration on the GAC was significantly less than total Fe. Analysis of the GAC, via ICAP, involved a digestion step, and, therefore, the Fe and Mn concentration data represented total Fe and Mn rather than available Fe and Mn for reaction. It is unclear what fraction of the total Fe or Mn was available to react with $H_2O_2$. Although limited Mn concentrations were measured for the GAC reported here, analysis of other GACs involved in similar studies in laboratory of the present inventors indicates that total Mn concentrations are much higher in other GAC and provide a plausible, non-productive sink for $H_2O_2$ (data not shown).

TABLE 3

Metal Analysis Results of GAC via ICAP

| Granulated Activated Carbon (Calgon Chemical Corp.) | Metal Concentration (mg/Kg) (n = 2) | |
|---|---|---|
| | Fe | Mn |
| F-300 type | 1130 | 3.6 |
| EXP-4 | 24.0 | <0.55 |
| EXP-4 low* | 5500 | <0.7 |
| EXP-4 med.* | 9790 | 3.0 |
| EXP-4 high* | 12050 | 5.1 |

*low, med. and high iron concentration on the GAC resulted from iron amendment

Addition of Fe to EXP4 carbon was performed for the purposes of enhancing oxidation and improving treatment efficiency. Three Fe concentrations were evaluated (low, medium, high) (Table 4). The baseline total Fe concentration in EXP4 GAC was 24.0 mg/Kg. $H_2O_2$ degradation conformed to pseudo first-order kinetics and was greatest in the unamended (Fe) GAC. Despite the low Fe concentration on the unamended GAC, greater initial slurry pH contributed to increased $H_2O_2$ degradation. In the Fe amended GAC, $H_2O_2$ half-lives decreased, and total $Cl^-$ recovery and TR increased with increased Fe concentration.

TABLE 4

Effect of GAC Iron Concentration on Treatment Ratio in Calgon Chemical Corp. EXP4 GAC
Three Applications of 100 mL $H_2O_2$

| $GAC^1$ | [$Fe_T$] (mg/Kg) | $H_2O_2^2$ $t_{1/2}$ ($hr_{-1}$) | $pH_i$, $pH_f$ | Ratio$^4$ $\Sigma Cl^{-3}$ (moles) | Treatment ($\times 10^{-4}$ mole/mole) |
|---|---|---|---|---|---|
| EXP4 (none) | 24.0 | 4.5, 4.2, 5.9 | 5.5, 4.4 | 1.1 × 10$^{-5}$ | 1.4 |
| EXP4 - low | 5500 | 7.1, 9.4, 11.4 | 4.6, 3.3 | 2.9 × 10$^{-5}$ | 4.4 |
| EXP4 - med | 9790 | 6.8, 7.5, 7.7 | 4.6, 3.1 | 5.0 × 10$^{-4}$ | 6.9 |
| EXP4 - high | 12050 | 5.6, 5.5, 5.7 | 4.6, 3.1 | 6.0 × 10$^{-4}$ | 7.8 |

$^1$[2CP]$_i$ = 35.4 g/Kg
$^2$avg. (n = 3) [$H_2O_2$]$_{initial}$ = 9222, 9370, 9420, 9340 mg/L
$^3\Sigma Cl^-$ released corrected for background $Cl^-$
$^4\Sigma Cl^-/\Sigma H_2O_2$ (avg. n = 3)

The low initial slurry pH in Fe amended reactors is attributed to the acidity associated with $FeSO_4 \cdot 7H_2O$ used to alter the Fe content of the GAC. The pH decline with time may be attributed to different mechanisms: acid production associated with the Fenton mechanism; hydrogen ion release from the oxidation of 2CP; and production of acidic compounds, such as carboxylic acids. Since the solubility of ferrous Fe is inversely proportional to pH, some Fe may become soluble (mobile) under acidic conditions. FeT measured in unfiltered slurry samples (i.e., soluble or solid phase) containing GAC with 24.0 or 5500 $Fe_T$ mg/Kg was <1.0%, and with 9790 and 12050 $Fe_T$ mg/Kg, was 3 and 3.5%, respectively.

Three $H_2O_2$ concentrations (0.94, 2.1, 7.1% w/w) in conjunction with Calgon Chemical Corp. GAC EXP4 (low Fe) were evaluated with respect to 2CP sorption and oxidation. The degradation rate of $H_2O_2$ conformed to pseudo-first order degradation kinetics and half-lives increased with increasing $H_2O_2$ concentration (Table 5). The overall $H_2O_2$ degradation rate decreased 60–78% with increasing $H_2O_2$ application to the GAC. The decrease in $H_2O_2$ degradation rate may be partially attributed to the decrease in pH; however, the precise mechanism is unknown.

TABLE 5

Effect of Hydrogen Peroxide Concentration on the Adsorption and Oxidation Treatment Efficiency in Calgon Chemical Corp. EXP4 GAC Low Iron
[$Fe_T$] = 5500 mg/Kg); 35.4 g/Kg 2CP;
Three Applications of 100 mL $H_2O_2$

| [$H_2O_2$]$_i$ (M) | $H_2O_2$ $t_{1/2}$ (hr$^{-1}$) | $pH_i$, $pH_f$ | $\Sigma Cl^-$ [1] (moles) | Treatment Ratio[2] ($\times 10^{-4}$ mole/mole) |
|---|---|---|---|---|
| 0.28 | 7.1, 9.4, 11.4 | 4.4, 3.3 | $2.9 \times 10^{-5}$ (11%) | 1.3, 5.4, 7.4 (4.7) |
| 0.63 | 8.9, 13.6, 15.8 | 4.6, 2.9 | $9.1 \times 10^{-5}$ (33%) | 3.1, 8.1, 9.8 (7.0) |
| 2.1 | 17.1, 27.0, 29.4 | 4.6, 2.7 | $1.5 \times 10^{-4}$ (55%) | 3.1, 5.7, 3.6 (4.1) |

[1]$\Sigma Cl^-$ released corrected for background $Cl^-$, percent chloride recovery from 2CP in parentheses
[2]$\Sigma Cl^-/\Sigma H_2O_2$ for each application; average in parentheses An increase in [$H_2O_2$] will increase [.OH] linearly as per the source term in eq 2 (i.e., $k_2$ [Fe(II)] [$H_2O_2$]), and correspond to an increase in the rate of 2CP oxidation (eq 1). However, increased radical scavenging may reduce treatment efficiency. For example, increased concentrations of scavengers such as $Cl^-$ and $H_2O_2$ would increase the rate of scavenging (i.e., rxns 4 and 5) resulting in a nonlinear response in treatment efficiency. In these data, the TR increased between reactors containing 0.28 and 0.63 M $H_2O_2$, but either remained the same or decreased between reactors containing 0.63 M and 2.1 M $H_2O_2$ (Table 6). The increase in TR was partially attributed to pH since the final pH was lower. The decrease in TR was attributed to increased scavenging from $H_2O_2$ (i.e., greater $S_i$). Reaction rate kinetics may have been limited during the last application of $H_2O_2$ (2.1 M). Overall, the extent of 2CP oxidation, as indicated by total $Cl^-$ recovery, increased with increased [$H_2O_2$], but it was less efficient at the higher $H_2O_2$ concentration (2.1 M).

TABLE 6

Effect of 2CP Concentration on the Adsorption and Oxidation Treatment Efficiency in Calgon Chemical Corp. EXP4 GAC

| [2CP]$_i$ (g/Kg) | [Fe]$_t$ (mg/Kg) | $CL^-$ [1] (moles $\times 10^{-5}$) | $H_2O_2$ (moles $\times 10^{-2}$) | Treatment Ratio[4] ($\times 10^{-4}$ mole/ mole) |
|---|---|---|---|---|
| 2.4 | 24.0 | 0.34 | 2.1[2] | 1.2 (0.66–1.7) |
| 6.3 | 24.0 | 0.31 | 2.1[2] | 1.2 (0.54–2.0) |
| 11.8 | 24.0 | 0.45 | 2.1[2] | 1.4 (1.0–1.8) |
| 19.7 | 24.0 | 0.76 | 2.1[2] | 3.3 (2.5–4.1) |
| 31.5 | 24.0 | 1.2 | 2.1[2] | 6.0 (5.5–6.7) |
| 131 | 9790 | 7.6, 12.1, 8.3 | 1.6, 1.5, 1.3[3] | 47, 81, 64 |

[1]$\Sigma Cl^-$ released corrected for background $Cl^-$
[2]100 mL [$H_2O_2$]$_i$ = 0.21 M; $H_2O_2$ $t_{1/2}$ = 3.5 (hr$^{-1}$)
[3]Three applications of 100 mL [$H_2O_2$]$_i$ = 0.21 M
[4]$\Sigma Cl^-/\Sigma H_2O_2$ (95% confidence interval; lower interval value for TR = $\Sigma CL^-_{upper}/\Sigma H_2P_{2lower}$, where $Cl^-_{lower}$—$Cl^-_{upper}$, and $H_2O_{2lower}$—$H_2O_{2upper}$ are the respective lower-upper 95% confidence interval concentration values for $Cl^-$ and $H_2O_2$ respectively The TR is influenced by the initial 2CP concentration on the GAC (Table 6). Where the initial $H_2O_2$ and Fe concentrations and the soil slurry pH (5.5) were equal in five reactors, the data suggest an increase in oxidation efficiency was attributed to greater 2CP concentration on the GAC. A statistically significant difference in TR was not observed at low concentrations (2.4–11.8 g/Kg). A significant increase in the TR was observed in the reactor where the initial 2CP (131 g/Kg) and Fe (9790 mg/Kg) concentrations were increased and the average pH lower (3.1). In this reactor, it cannot be specifically determined what affect elevated Fe and 2CP concentrations had on treatment efficiency, since the pH was lower. However, increased Fe and 2CP concentrations on the surface of the GAC would result in a greater probability of reaction between 2CP and .OH.

GC/MS analysis of GAC (EXP4 med., Table 4) was performed to identify decomposition products resulting from the oxidation of 2CP. Controls were used to differentiate compounds extracted from GAC not attributed to 2CP or its oxidation products. Carbonate and unknown nitrogen derivatives (CND) were extracted from the GAC indicating background compounds (Table 7). 2CP and CND were found in the GAC where 2CP was applied. Extraction of the Fe amended GAC yielded a tBDMS sulfate derivative (SD) in addition to 2CP and CND. Under oxidizing conditions, several organic acid byproducts were measured. The most abundant were confirmed to be oxalic and maleic acids, while minor acids were identified as malonic and fumaric. Based on the mass spectrum, tentatively identified compounds include another abundant compound, 2-chloromaleic acid, and minor compounds included hydroxychlorobenzoic acid, two isomers of dihydroxychlorobenzene and a dimer of chlorophenol. Measurement of these chlorinated byproducts indicates that under oxidative conditions, transformation of 2CP involved ring cleavage without the release of $Cl^-$. These results are consistent with Getoff and Solar (1986) who reported 2CP oxidation via .OH yields byproducts which may include $Cl^-$ release, hydroxy benzenes (phenol, catechol, resorcinol, hydroquinone, hydroxyhydroquinone), dimers, and chlorinated isomers.

TABLE 7

GC/MS Analysis of GAC[1]

| [$Fe_T$] (mg/Kg) | [2CP]$_i$ (g/Kg) | [$H_2O_2$]$_i$ (M) | Organic Compounds |
|---|---|---|---|
| 24.0 | — | — | carbonate and nitrogen derivatives (CND) |
| 24.0 | 35.4 | — | 2CP, CND |
| 9790. | 35.4 | — | 2CP, CND, sulfate derivative (SD) |
| 9790. | — | 9440 | CND, SD |
| 9790. | 35.4 | 9420 | 2CP, CND, SD, oxalic acid, maleic acid, 2-chloromaleic acid, malonic, fumaric acid |

[1]Calgon Chemical Corp. EXP4; 40 mL 2CP 6880 $\mu$M or 40 mL DI; three applications of 100 ml $H_2O_2$ or 100 mL DI Sequential adsorption/oxidation was evaluated by adsorbing 2CP to the GAC (Calgon Chemical Corp. EXP4, 5500 mg/Kg Fe) in three successive events using similar procedures (volume, concentration, equilibrium time), and oxidizing the GAC suspension between sorption events. $H_2O_2$ (100 mL, 0.59 M) was applied twice to the GAC (119 g/Kg 2CP) and 62% of the $Cl^-$ from the sorbed 2CP was recovered. 2CP was re-adsorbed (90 g/Kg 2CP), $H_2O_2$ applied (100 mL, 2.9 M) and 125% of the $Cl^-$ as 2CP re-amended to the GAC was recovered. This was due to residual $Cl^-$ retained on the carbon after oxidation with 0.59 M $H_2O_2$. The overall $Cl^-$ recovery from both oxidations was 89%. 2CP (97 g/Kg) was re-amended to the GAC. These data indicate that aggressive oxidation did not alter the GAC surface to a degree that significantly interfered with the 2CP adsorption reaction.

Contaminants in water are adsorbed onto sorbents and oxidized in the presence of iron, which may be present on the sorbent or added with the oxidant, via Fenton-driven reactions. The selection of sorbent affects treatment effectiveness, since the concentration of oxidant reactants, such as iron and manganese, varies between manufacturers of granulated activated carbon. The iron content of the sorbent can be altered to enhance the Fenton-driven oxidation reactions. The rate and extent of oxidation depends on oxidant concentration, which affects hydroxyl radical concentration and scavenging. The efficiency of oxidation increases with increased contaminant concentration on the surface of the sorbent.

Additional experiments were conducted to investigate carbon regeneration using Fenton's mechanism. Carbons were loaded with 2CP and amended with $H_2O_2$ solutions. Dependent variables included iron oxide loading on the carbon surface, 2CP mass loading, and initial $H_2O_2$ concentration. Dependent variables included chloride ion concentration, pH, and time-dependent aqueous phase $H_2O_2$ concentration. Transformation byproducts from 2CP oxidation were identified. To investigate the effect of Fenton-driven carbon regeneration on the affinity between 2CP and carbon, sequential cycles of 2CP adsorption and oxidation were carried out.

Effects of Iron Level, 2CP Loading and $H_2O_2$ Concentration

For carbon adsorption of 2CP, 1.0 g GAC was suspended in 40 to 160 mL of a 6.0 mM 2CP solution. Reactors (Erlenmeyer flasks) containing the slurries were placed on an orbital shaker table for 24 hrs after which the 2CP solution was decanted. Previous work (not shown) indicated that 24 hrs is sufficient for attainment of equilibrium partitioning of 2CP between the liquid phase and carbon surface. Mass loadings were calculated based on initial and final measurements of 2CP concentration in the carbon slurries. Oxidation was accomplished by amending the GAC with 100 mL $H_2O_2$(00.21, 0.28, 0.63, or 2.1 M). The spent $H_2O_2$ solution was decanted after approximately 24 hrs. On one set of experiments, the process was repeated two more times to extend the number of adsorption/oxidation cycles. Reactors were wrapped in aluminum foil to prevent photodecomposition, covered with parafilm to minimize volatile losses and evaporation, and placed on an orbital shaker table (100 rpm). $H_2O_2$, Cl$^-$, pH, 2CP, and total iron ($Fe_T$) concentrations were measured. Control reactors containing GAC and $H_2O_2$ but no 2CP were used to measure and correct for background Cl$^-$ released from the GAC. The concentration of 2CP (0.23 mM) was stable (>48 hrs) both in control solutions with varying pH (pH 2.4–7.7, 0.38 mM 2CP) and in GAC- and Fe-free control reactors containing $H_2O_2$(0.15 M).

Effects of Repeated Adsorption/Oxidation Steps

To establish the effect of repeated adsorption/oxidation on the subsequent adsorption of 2CP, 1 g GAC was placed in 160 mL of a 6.0 mM solution of 2CP. The solution was decanted after 24 hrs and amended with 100 mL of $H_2O_2$ (0.59M) in two sequential (replicate) applications. The spent $H_2O_2$ solutions were decanted. The adsorption/oxidation steps were repeated using 160 mL of a 6.0M solution of 2CP, except the $H_2O_2$ solution (100 mL, 2.9M) was applied once. Finally, the spent $H_2O_2$ solution was replaced with 2CP solution (160 mL, 6 mM) for a third adsorption step.

GAC Preparation, Sampling, and Analytical

Samples (1.5 mL) were pipetted from a completely mixed suspension and filtered using a Gelman 0.2 $\mu$m filter to stop all reactions and remove colloidal particles. The filtrate was immediately sampled and analyzed for $H_2O_2$ and subsamples were stored at 4° C. and analyzed for 2CP when each experiment was completed. Reagent grade 2CP was from Aldrich Chemical.

2CP analyses were performed using a Waters high pressure liquid chromatograph Alliance Separations Module (Model No. 2690) with a Waters 996 Photodiode Array detector and a Nova-Pak C18 stainless steel column. The mobile phase wsa 30% acetonitrile and 0.3% acetic acid in deionized (DI) water; flow rate was 1.0 mL./min; injection volume was 100 $\mu$L; $\lambda$=220 nm; average retention time was approximately 5.7 minutes. The 2CP standard curve ranged from 0 to 400 $\mu$M, $r^2$=0.999, 0.14 $\mu$M detection limit. Check standards, duplicates, and spikes were run with each sample set.

$H_2O_2$ was measured using a modified peroxytitanic acid calorimetric procedure (Boltz and Howell, 1978) as decribed previously (Huling et al., 1998). The detection limit was 2.9 $\mu$M. Filtered samples from GAC slurries were prepared in triplicate and analyzed. $TiSO_4$ reagent was purchased from Pfaltz and Bauer Inc., and $H_2O_2$ (30 wt. % solution in water) was purchased from the Aldrich Chemical Company. Chloride ion analyses was by Waters capillary electrophoresis Method N-601 Cl$^-$. Iron analysis of the filtrate solution was by EPA Method No. 3500-Fe D, Phenanthroline method.

Positive identification of 2CP and Fenton-dependent transformation products on the GAC was accomplished via gas chromatography and mass spectroscopy (GC/MS) and involved a derivatization technique using N-methyl-N-[(tert-butyldimethly)silyl]trifluoroacetamide (MTBSTFA) (Aldrich Chemical Co., Milwaukee, Wis.) that yielded tert-butyldimethylsilyl(tBDMS) ethers and esters (Heberer et al., 1997; Mawhinney et al., 1983; 1986). For each treatment, 100 $\mu$L of acetonitrile and 100 $\mu$L of MTBSTFA were added to 100 mg of GAC. This mixture was heated for one hour at 60° C. 2CP, carbonic acid, sulfuric acid and eleven dioic and hydroxy acids were derivatized to confirm the identity of reaction products. Derivatized extracts were injected into a Finnigan 4600 GC/MS. A Hewlett Packard 7673 auto-injector delivered 1.0 $\mu$L of the extract under splitless conditions onto a J&W Scientific, DB5-MS capillary column (60 m; 0.25 mm i.d.; 0.25 $\mu$m film thickness). The column was temperature programmed from 100° C. to 300° C. at 6° C./min. The mass spectrum was scanned from 42 to 650 m/z in 0.5 sec. The injection and transfer oven temperatures were 275° C.

The GAC slurry pH was measured using an Orion Sure-Flow ROSS Combination pH probe. The pH of the GAC suspension was not controlled during any of the experiments. Buffers were not used since they would introduce radical scavengers which may significantly affect oxidation efficiency.

EXP4 GAC was supplied by Calgon Carbon Corp. (Pittsburge, Pa.). EXP4 GAC was derived from the same starting raw material as F-300, a commercially available GAC, but activated differently by Calgon Carbon Corporation to minimize $H_2O_2$ reactivity (Hayden, 1998). Particle size distribution was 8×30 mesh for all GACs. Iron oxides were precipitated on EXP4 GAC at low, medium, and high concentrations by mixing 15 g GAC into solutions comprised of 38 mL of DI water and 0.744, 3,73, and 7.44 g $FeSO_4$.7 $H_2O$ was purchased from Johnson Matthey (Ward Hill, Mass.). The pH of the GAC suspension prepared with the acidic $FeSO_4$ solution was adjusted to pH 5.5 with NaOH(1M) The GAC/Fe slurry was rinsed and filtered with DI water through a number 35 sieve (500 $\mu$m, 0.019"). The GAC was then air dried and stored at room temperature until used. Under the conditions of these procedures, iron was present predominantly as Fe(III) oxides rather than Fe(II), although the mineral form of iron was not identified. Representative samples of the GAC/Fe stock were analyzed by inductively coupled argon plasma (ICAP) (USEPA, 1996). Metals were extracted from the GAC by digesting 0.25 g in 40 mL of 10% nitric acid for 40 minutes in a microwave oven at 150° C. and 1000 kPa (USEPA, 1995.)

Results

Batch Regeneration Studies

The iron and manganese concentrations in the GAC, and batch regeneration performance data are summarized in Table 1. Baseline levels of Fe(24.0 mg/kg) and Mn(<0.55 mg/kg) in the unamended GAC were very low, allowing us to prepare carbons with anomalously high Fe/Mn ratios (>$10^3$) by precipitating Fe on the surface. Since total Fe and Mn were determined following digestion of the GAC, the fraction of total metals that were available to react with $H_2O_2$ is not known. Although limited Mn concentrations were measured for the GAC reported here, ICAP analyses of other commercially available GACs (data not shown) used in similar studies in our laboratory indicated that total Mn concentrations are generally much higher and provide a plausible, non-productive sink for $H_2O_2$ and a source of treatment inefficiency.

The treatment ratio (TR) is defined as the molar ration of $Cl^-$ liberated to $H_2O_2$ consumed over the same time frame (i.e. $\Delta Cl^-/\Delta H_2O_2$). Treatment efficiency is TR×100. It was assumed that 2CP oxidation results in $Cl^-$ cleavage and release.

Addition of Fe to EXP4 carbon was performed for the purpose of enhancing oxidation and improving treatment efficiency. Three enhanced Fe concentrations were evaluated (low, medium, high) (Table 1). Half lives were determined for $H_2O_2$ via regression analysis. In each case, the coefficient of determination ($r^2$) for the line of best fit was >0.97. $H_2O_2$ consumption kinetics were approximately first order in $H_2O_2$ concentration. Incremental iron loading on the GAC led to faster $H_2O_2$ consumption, greater $Cl^-$ release and more efficient use of $H_2O_2$. Treatment ratio calculations based on these experiments underscore the contribution of iron amendment to achievement of treatment objectives.

The low initial slurry pH (pH 4.6) in Fe amended reactors was due to acidity associated with $FeSO_4$.7 $H_2$ O used to alter the Fe content of the GAC. The pH decline measured in these reactors was attributed to different mechanisms, including acid production associated with the Fenton mechanism; hydrogen ion release from 2CP oxidation; and the production of acidic compounds, such as carboxylic acids. Due to the increasing acidity, the solubility of iron increased. Upon complete reaction of $H_2O_2$ total iron was measured in the solution in each test reactor. The total iron measured in solution accounted for <1%, 3%, and 3.5% of the total mass of iron initially present on the GAC at 5500, 9790, and 12050 mg/kg Fe, respectively. On this basis, the reaction of soluble iron may have contributed to $H_2O_2$ depletion, radical generation, and 2CP oxidation.

$H_2O_2$ and 2CP Concentration Effects

The effect of initial $H_2O_2$ concentration (0.28, 0.63, 2.1M) on the oxidation of 2CP was investigated in slurries of low iron (5.5 g/kg), EXP4 GAC. Time-dependent $H_2O_2$ concentrations indicated that $H_2O_2$ consumption kinetics were approximately first order in $H_2O_2$ concentration (FIG. 1) Half-lives increased with increases in $H_2O_2$ concentration and with each $H_2O_2$ renewal (Table 2). Such changes were due in part to pH effects.

At higher $H_2O_2$ concentrations, .OH productions should increase as per the source term in the .OH reactions equation. An increase in .OH production should correspond to an increase in the rate of 2CP oxidation. However, an increase in scavenger concentration, such as $H_2O_2$, and the reaction byproduct $Cl^-$, will result in an increase in the rate of radical scavenging leading to a reduction in treatment efficiency. In three consecutive regeneration periods, the TR increased from an average value of $4.7\times10^{-4}$ (mole/mole) to $7\times10^{-4}$ in reactors containing 0.28 and 0.63M $H_2O_2$, respectively (Table 2). The increase in TR was partially attributed to the decline in pH. The average value of TR decreased between reactors containing 0.63M and 2.1M $H_2O_2$ (Table 2). The decline in TR at higher $H_2O_2$ concentration was attributed to an increase in scavenging from $H_2O_2$. Additionally, reaction rate kinetics may have been limited due to low 2CP concentration on the GAC during the last application of $H_2O_2$. Overall, the extent of 2Cp oxidation, as indicated by total $Cl^-$ release with increased [$H_2O_2$], but it was less efficient at the higher $H_2O_2$ concentration (2.1M).

Under experimental conditions where the initial $H_2O_2$ concentration, total Fe, and pH were similar between reactors, but 2CP loading on the GAC was varied, a positive correlation was established between the treatment ratio and 2CP loading (Table 2). An additional increase in the initial 2CP (131 g/kg) and total iron (9790 mg/kg) concentrations on the GAC also increased the treatment ratio. The source of this increase cannot be specifically determined since the final pH was lower (pH 3.1). Nevertheless, an increase in either the Fe or 2CP concentration on the surface of the GAC would result in a greater probability of reaction due to the relative proximity of radical generation and target compound.

Sequential Adsorption/Oxidation

To investigate the effect of Fenton reactions on 2CP sorption to GAC, sequential adsorption/oxidation cycles were performed by adsorbing 2CP to the GAC (EXP4, 5.5 g/kg Fe) in three successive events using similar procedures, and oxidizing the GAC suspension between sorption events. The first oxidation step involved sequential (replicate) application of $H_2O_2$ solutions (100 mL , 0.59M) to the GAC containing 119 g/kg 2CP. 62% of the $Cl^-$ from the sorbed 2CP was recovered. 2CP was re-adsorbed (90 g/kg 2CP), and the second oxidation step (100 mL , 2.9M $H_2O_2$) resulted in 125% recovery of the $Cl^-$ in this case was attributed to residual $Cl^-$ retained on the carbon after the first oxidation step. The overall $Cl^-$ recovery from all oxidation events was 89%. Finally, 2CP was re-adsorbed to the GAC (97 g/kg). Results indicate that the aggressive oxidation procedure used here did not alter the affinity of the GAC surface for 2CP to a degree that significantly interfered with subsequent 2CP adsorption reactions.

Product Analysis

The products of oxidative carbon regeneration, identified via GC/MS, included a variety of organic acids. Oxalic and maleic acids were the most abundant, while minor acids were identified as malonic and fumaric. Based on the mass spectrum, tentatively identified compounds include another abundant compound, 2-chloromaleic acid, and minor compounds included hydroxychlorobenzoic acid, two isomers of dihydroxychlorobenzene and a dimer of chlorophenol. Measurements of these chlorinated byproducts indicate that under oxidative conditions, transformation of 2CP involved ring cleavage without the release of chloride ion. Results are consistent with Getoff and Solar (1986) who reported 2CP oxidation via .OH yields byproducts including $Cl^-$, hydroxy benzenes (phenol, catechol, resorcinol, hydroquinone, hydroxyhydroquinone), dimers, and chlorinated isomers. Controls were used to differentiate compounds extracted from GAC not attributed to 2CP nor its oxidation products. None of the transformation byproducts identified above were extracted fro mthe GAC or iron-amended GAC (35.4 g/kg 2CP) before the regeneration step or from the iron-amended GAC following reaction with $H_2O_2$.

Discussion

The extent and efficiency of 2CP oxidation increased with either 2CP or iron oxide on the carbon surface. These observations are consistent with a conceptual model in which contaminant adsorption sites and radical-generation sites are in proximate locations on the GAC surface. An increase in the contaminant or iron concentration on the GAC surface should increase the kinetics of reactions involving .OH and target sorbates. Desorption and oxidation of the contaminant in the aqueous phase will also occur. However, due to the extreme reactivity of the radical, radicals produced heterogeneously will react at or near the surface of the carbon. An increase in the $H_2O_2$ concentration resulted in an increase in the extent of 2CP oxidation but not in the treatment efficiency. The sources of oxidation inefficiency include non-productive reactions and .OH scavenging. The former can be minimized by selecting a carbon with low $H_2O_2$ reactivity. This can be accomplished using carbon with a low manganese content. Oxidation efficiency can also be improved by judicious selection of pH (Watts, et al., 1991). However, since $H_2O_2$ itself reacts with .OH, a tradeoff between radical generation and scavenging rates is unavoidable. $H_2O_2$ concentrations and the concentrations of naturally occurring radical scavengers in water used to prepare the $H_2O_2$ solution can be selected to minimize scavenging. Overall, these process parameters, and others should be carefully selected to satisfy process objectives at minimum or acceptable cost.

Experimental results involving repeated adsorption/oxidation cycles suggest that on-site regeneration of GAC is possible. Long term, multi-regeneration adsorption/oxidation cycles (i.e., >2) may possibly indicate surface weathering of the carbon or an accumulation of poorly oxidizable compounds which may result in a lower affinity for the target sorbate(s). Although the data provided indicate that treatment efficiency was low in these reactor configurations, process parameters were not fully optimized. The overall feasibility of the proposed carbon regeneration process must be based on site-specific adsorption-oxidation studies, in conjunction with a site-specific, detailed cost analysis. Costs associated with excavation of spent GAC, transport to a disposal or regeneration facility, disposal, regeneration, transport of regenerated carbon back to the treatment facility, re-emplacement of the GAC, make-up GAC, $H_2O_2$, iron, etc., must all be considered.

The breadth of ground water contaminants amenable to separation on carbon and oxidation via the Fenton-driven mechanism is large. That is, many environmental contaminants are sufficiently hydrophobic for removal on activated carbon and react at moderately high rates with .OH. Therefore, a wide range of contaminant classes, including mixtures of contaminants (i.e., semi-volatiles, BTEX, pesticides, halogenated volatiles, etc.), are amenable to treatment via the adsorption/oxidation process. The proposed process could be implemented in above-ground reactors or within a reactive barrier wall. A permeable reactive barrier such as that described by Obrien et al. (1997), could be modified to include GAC/Fe media, intermittent $H_2O_2$ perfusion, and $O_2$ (g) venting to facilitate in-situ treatment. There would be several advantages over a barrier containing zero-valent iron, which is unsuitable for destruction of contaminants not amendable to reductive transformations. Thus, the proposed process could provide a long-term barrier and treatment system for mixtures of groundwater contaminants that partition onto activated carbon and react rapidly with .OH.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

REFERENCES

Aggarwal et al, *J. Hazardous Materials* 3(27):301–314 (1991)

Boltz et al, *Interscience Publications* pp. 543 (1978)

Buxton et al, *J. Phys. Chem. Reference Data* 2(17):513–886 (1988)

Dorfman and Adams, *National Bureau of Standards*, Report No. NSRDS-NBS-46 (1973)

Gates and Siegrist, *J. Environmental Engineering* pp. 639–644 (Sep 1995)

Gethoff and Solar, *Radiat. Phys. Chem., Int. J. Radiat. Appl. Instrum. Part C* 5–6(28):443–450 (1986)

Haag and Yao, *Environ. Sci. Technol.* 5(26):1005–1013 (1992)

Hayden, Calgon Carbon Corporation (1998)

Heberer and Stan, *Anal. Chim. Acta* 341:21–34 (1997)

Huling et al, *Environ. Sci. Technol.* 21(32):3436–3441 (1998a)

Huling et al, *J. Environ. Eng.* Accepted (October, 1998b)

Huling et al, *J. Environ. Eng.* (March, 2000)

Ingles (1972)

Lipczynska-Kochany et al, *Chemosphere* 30(1):9–20 (1995)

Mawhinney, *J. Chromatogr.* 257:37–44 (1983)

Mawhinney et al, *J. Chromatogr.* 361:117–130 (1986)

Nicholls and Schonbaum, "Catalases" in *Enzymes*, Boyer et al, Eds., John Wiley: New York, Vol. 8, pp. 147–225 (1963)

O'Brien et al, "Implementation of a Funnel and Gate System", presented at International Containment Technology Conference and Exhibition, St. Petersburg, Fla., Feb. 9–12, 1997

Pardieck et al, *J. Contaminant Hydrology* 9(3):221–242 (1992)

Pignatello, *Environ. Sci. Technol.* 26(5):944–951 (1992)

Ravikumar and Gurol, *Environ. Sci. Technol.* 3(28):394–400 (1994)

Schumb et al, *Hydrogen Peroxide*, American Chemical Society Monograph Series, Reinhold Publishing Corporation New York, N.Y., p. 759 (1955)

Shetiya et al, *Indian J. Chem.* 14A:575–578 (1976)

USEPA, 1991 Subsurface Contamination Reference Guide

USEPA, 1995 Standard Operating Procedure No. 180. "Total Nitric Acid Extractable Metals from Solids and Sludges by Microwave Digestion"

USEPA, 1996 Standard Operating Procedure No. 181. "ICP Operation by TJA Mark II System"

Walling, *Accounts of Chemical Research* 8:125–131 (1975)

Watts et al, *Hazardous Waste and Hazardous Materials* 4(7):335–345 (1990)

Watts et al, "Treatment of Contaminated Soils Using Catalyzed Hydrogen Peroxide" in *Chemical Oxidations: Technology for the Nineties*, W. W. Eckenfelder et al (Eds) (1991)

Watts et al, *Water Environ. Research* 7(65):839–844 (1993)

Yeh and Novak, *Water Environ. Research* 67(5):828–834 (1995).

What is claimed is:

1. A process for treating contaminants in water comprising:
    concentrating the contaminants by passing water containing contaminants through a sorbent amended with or containing iron to which the contaminants adsorb and are concentrated, and
    adding an oxidant which produces hydroxyl radicals at the sorbent whereby the contaminants are oxidized using a Fenton-driven mechanism and are destroyed in situ, and the sorbent is regenerated in situ.

2. The process according to claim 1 wherein the sorbent is amended with iron selected from the group consisting of ferrous iron and ferric iron.

3. The process according to claim 1 wherein the sorbent is selected from the group consisting of activated carbon, anion exchange resins, cation exchange resins, zeolites, alumina, silica, silicates, and aluminum phosphates.

4. The process according to claim 3 wherein the adsorbent is activated carbon.

5. The process according to claim 1 wherein the oxidizing agent is selected from the group consisting of hydrogen peroxide, ozone, permanganate salts and persulfate salts.

6. A process for treating contaminants in water comprising:
    concentrating the contaminants in the water by passing the water containing contaminants through a sorbent to which the contaminants adsorb and are concentrated;
    adding a composition comprising iron and an oxidant to the sorbent whereby the contaminants are oxidized using a Fenton-driven mechanism and are destroyed in situ, and the sorbent is regenerated in situ.

7. The process according to claim 6 wherein the iron is selected from the group consisting of ferrous iron and ferric iron.

8. The process according to claim 6 wherein the sorbent is selected from the group consisting of activated carbon, anion exchange resins, cation exchange resins, zeolites, alumina, silica, silicates, and aluminum phosphates.

9. The process according to claim 8 wherein the adsorbent is activated carbon.

10. The process according to claim 6 wherein the oxidizing agent is selected from the group consisting of hydrogen peroxide, ozone, permanganate salts and persulfate salts.

11. The process according to claim 1 wherein the water containing contaminants is treated above ground.

12. The process according to claim 1 wherein the water containing contaminants is treated below ground.

13. The process according to claim 12 wherein the water containing contaminants is treated in a hydraulic barrier/treatment unit.

14. The process according to claim 6 wherein the water containing contaminants is treated above ground.

15. The process according to claim 6 wherein the water containing contaminants is treated below ground.

16. The process according to claim 15 wherein the water containing contaminants is treated on a hydraulic barrier/treatment unit.

17. The process according to claim 1 wherein the iron is reduced by reacting the iron with byproducts of the Fenton reaction or by reaction with chemical reductants which are not byproducts of the Fenton reaction.

18. The process according to claim 17 wherein said chemical reductants are selected from the group consisting of sodium dithionite and hydroxylamine.

19. A process for treating contaminants in water consisting essentially of:
    passing water containing contaminants which can be oxidized by a hydroxyl ion through a sorbent amended with or containing iron to which the contaminants adsorb and are concentrated; and
    adding an oxidant which produces hydroxyl radicals at the sorbent, whereby the contaminants are oxidized using a Fenton-driven mechanism and are destroyed in situ, and the sorbent is regenerated in situ.

* * * * *